(12) United States Patent
Ikeda

(10) Patent No.: US 8,342,961 B2
(45) Date of Patent: Jan. 1, 2013

(54) COMPUTER, PROGRAM, AND STORAGE MEDIUM

(75) Inventor: Youichiro Ikeda, Osaka (JP)

(73) Assignee: Capcom Co., Ltd., Osaka (JP)

( * ) Notice: Subject to any disclaimer, the term of this patent is extended or adjusted under 35 U.S.C. 154(b) by 228 days.

(21) Appl. No.: 12/810,246

(22) PCT Filed: Dec. 26, 2008

(86) PCT No.: PCT/JP2008/003988
§ 371 (c)(1),
(2), (4) Date: Jun. 23, 2010

(87) PCT Pub. No.: WO2009/084213
PCT Pub. Date: Jul. 9, 2009

(65) Prior Publication Data
US 2010/0279770 A1 Nov. 4, 2010

(30) Foreign Application Priority Data
Dec. 28, 2007 (JP) .................................. 2007-338706

(51) Int. Cl.
*A63F 9/24* (2006.01)
(52) U.S. Cl. ............................... 463/31; 463/36; 463/37
(58) Field of Classification Search .................... 463/32, 463/31, 36, 37, 38; 345/156, 158
See application file for complete search history.

(56) References Cited

U.S. PATENT DOCUMENTS

| | | |
|---|---|---|
| 2001/0050687 A1 | 12/2001 | Iida et al. |
| 2003/0040349 A1 | 2/2003 | Imaeda et al. |
| 2003/0216176 A1 | 11/2003 | Shimizu et al. |
| 2004/0029640 A1 | 2/2004 | Masuyama et al. |
| 2007/0265084 A1 | 11/2007 | Sato et al. |
| 2008/0070684 A1* | 3/2008 | Haigh-Hutchinson ......... 463/32 |
| 2008/0113798 A1* | 5/2008 | Miyanaga et al. ............. 463/37 |
| 2009/0048009 A1* | 2/2009 | Brekelmans et al. ............ 463/4 |
| 2009/0135133 A1* | 5/2009 | Kunzler et al. .............. 345/156 |
| 2010/0214214 A1* | 8/2010 | Corson et al. ................ 345/158 |

FOREIGN PATENT DOCUMENTS

| | | |
|---|---|---|
| JP | 2002-298160 A | 10/2002 |
| JP | 2003-019348 A | 1/2003 |
| JP | 3902508 B | 1/2007 |
| JP | 2007-296247 A | 11/2007 |
| JP | 2007-310764 A | 11/2007 |

OTHER PUBLICATIONS

International Search Report mailed on Mar. 17, 2009 for the corresponding International patent application No. PCT/JP2008/003988.

* cited by examiner

*Primary Examiner* — Masud Ahmed
(74) *Attorney, Agent, or Firm* — Posz Law Group, PLC

(57) ABSTRACT

There are provided controller control means for receiving acceleration of movement of a housing or an angular speed of rotation of the housing from a controller operated by a user and image generating means for generating a game image obtained by photographing a predetermined direction from a predetermined viewpoint in a three-dimensional game space and for moving the viewpoint when the received acceleration or angular speed exceeds a predetermined threshold value. Alternatively, there are provided controller control means for receiving an angular speed of rotation in a first specific direction of a housing from a controller operated by a user and image generating means for generating a game image obtained by photographing a three-dimensional game space from a predetermined viewpoint and for starting movement to the first specific direction of the viewpoint when the received angular speed exceeds a predetermined threshold value.

20 Claims, 8 Drawing Sheets

COMPUTER, PROGRAM, AND STORAGE MEDIUM

TECHNICAL FIELD

The present invention relates to a computer, a program, and a storage medium which generate a virtual three-dimensional space and proceed with a game in the three-dimensional space.

BACKGROUND ART

In 3D games, a viewpoint (camera position) is set in a virtual game space, and an image in the game space seen from this camera position is displayed as a game image on a monitor. In general, the game image is an image seen from the back face of a main character operated by a user to a direction faced by the main character (See FIG. 5, for example).

However, such a game is proposed that the camera position can be moved by an operation by the user so that the user can see the entire game space. By moving the camera position, a situation behind the main character can be seen or the like (See FIG. 6, for example).

Also, as in Patent Document 1, a game system having a function to give a user a feeling that the game space is inclined by inclining a housing of a controller is proposed.

Patent Document 1: U.S. Pat. No. 3,902,508

SUMMARY OF INVENTION

Technical Problem

The camera position is moved by the operation of an operation member such as an analog stick or the like in general. However, there is a problem that if the user is operating the operation member for moving the camera position, an operation of the main character tends to be neglected and the main character is subjected to an attack by an enemy character.

Also, as in the game system in Patent Document 1, a game having a function to incline the game space through inclination of the housing of the controller not relying on the operation of the operation member is proposed, but since the game space is displayed in an inclined state corresponding to an absolute value of the inclination of the controller, the inclination of the game space is changed even by a slight change in an angle of the controller, which results in a problem that the operation is delicate, and the operation becomes extremely difficult if the user operates the controller in an attitude not standing upright such as lying down.

The present invention has an object to provide a computer, a program, and a storage medium that can control a camera position (viewpoint) photographing a game space with a simple operation to a housing of a controller.

Solution to Problem

A computer provided by a first aspect of the present invention includes controller control means for receiving an acceleration of movement of a housing of the controller or an angular speed of rotation of the housing from a controller operated by a user and image generating means for generating a game image obtained by photographing a predetermined direction from a predetermined viewpoint in a three-dimensional game space and moving the viewpoint if the received acceleration or angular speed exceeds a predetermined threshold value.

An operation member operated by a user is an operation member for performing important control of a game such as an operation of a main character. In this invention, the viewpoint of the game image (so-called camera position) is controlled on the basis not on the operation of the operation member but on rotation, vertical movement or the like of the housing of the controller. Also, in general, a sensor for detecting the movement of the housing, that is, an acceleration sensor for detecting an acceleration or an angular speed sensor for detecting an angular speed is a sensor for outputting a continuous amount (analog amount), but in this invention, the operation by the user is facilitated by binarizing an output value of this sensor by the threshold value and performing on/off control.

A computer provided by a second aspect of the present invention includes controller control means for receiving an angular speed of rotation in a first specific direction of the housing of the controller from the controller operated by the user and image generating means for generating a game image obtained by photographing a three-dimensional game space from a predetermined viewpoint and starting movement of the viewpoint in the first specific direction when the received angular speed exceeds a predetermined threshold value.

In a preferred embodiment of the present invention, the controller control means receives an angular speed of rotation in a second specific direction opposite to the first specific direction from the controller and the image generating means stops the movement of the viewpoint in the first specific direction if the angular speed in the second specific direction exceeds the predetermined threshold value while the viewpoint is moving in the first specific direction.

In the preferred embodiment of the present invention, the controller control means receives an acceleration of the movement of the housing in a predetermined direction, and the image generating means returns the position of the viewpoint to a predetermined initial position if the received acceleration of the movement exceeds the predetermined threshold value.

In the preferred embodiment of the present invention, the image generating means rotates the viewpoint around a point of gaze, which is a target point of a view from the viewpoint.

In the preferred embodiment of the present invention, the controller control means receives an acceleration of vertical movement and angular speeds of right rotation and left rotation on a horizontal plane of the housing, and the image generating means determines the initial position of the viewpoint and the point of gaze and if the angular speed of the right/left rotation detected by the angular speed sensor exceeds a predetermined first threshold value while the viewpoint stands still, the image generating means rotates the viewpoint to the right/left around the point of gaze at a predetermined angular speed, and if the angular speed of the left/right rotation detected by the angular speed sensor exceeds a predetermined second threshold value while the viewpoint is rotating to the right/left, the image generating means stops the rotation of the viewpoint and if the upward or downward acceleration detected by the acceleration sensor exceeds a predetermined third threshold value, the image generating means returns the viewpoint to the initial position.

In the preferred embodiment of the present invention, if the image generating means stops the rotation of the viewpoint since the angular speed exceeds the second threshold value, the image generating means does not determine if the angular speed exceeds the first threshold value or not for a certain period of time after that.

In the present invention, the viewpoint (camera position) is rotated to the right when the controller is rotated to the right at a predetermined angular speed, while the viewpoint is rotated to the left when the controller is rotated to the left. Also, by rotating the controller in a direction opposite to the rotating direction of the viewpoint, the rotation of the viewpoint is stopped. By matching the operation state to the controller with the moving mode of the camera position, intuitive operation by the user is made possible.

Also, in the present invention, if the rotation of the viewpoint is stopped by rotating the controller in the direction opposite to the rotating direction of the viewpoint, the determination on whether or not the angular speed of the rotation of the controller has exceeded the first threshold value, that is, determination on whether or not to start rotation and movement of the viewpoint, is not made for a certain period of time. As a result, start of the rotation and movement of the viewpoint in the opposite direction by the operation to stop the rotation and movement of the viewpoint can be prevented.

A program provided by a third aspect of the present invention makes a computer function as controller control means for receiving an acceleration of movement or an angular speed of rotation of a housing of the controller from a controller operated by a user and image generating means which generates a game image obtained by photographing a predetermined direction from a predetermined viewpoint in a three-dimensional game space and moves the viewpoint if the received acceleration or angular speed exceeds a predetermined threshold value.

A program provided by a fourth aspect of the present invention makes a computer function as controller control means for receiving an angular speed of rotation of a housing of the controller in a first specific direction from a controller operated by a user and image generating means for generating a game image obtained by photographing a three-dimensional game space from a predetermined viewpoint and starting movement of the viewpoint to the first specific direction if the received angular speed exceeds predetermined threshold value.

In the preferred embodiment of the present invention, the controller control means receives an angular speed of rotation in a second specific direction opposite to the first specific direction from the controller and the image generating means stops movement of the viewpoint to the first specific direction when the angular speed to the second specific direction exceeds a predetermined threshold value while the viewpoint is moving to the first specific direction.

In the preferred embodiment of the present invention, the controller control means receives an acceleration of movement of a housing in a predetermined direction, and the image generating means returns the position of the viewpoint to a predetermined initial position if the received acceleration of movement exceeds the predetermined threshold value.

In the preferred embodiment of the present invention, the image generating means rotates the viewpoint around a point of gaze, which is a target point of the view from the viewpoint.

In the preferred embodiment of the present invention, the controller control means receives an acceleration of vertical movement and angular speeds of right rotation and left rotation on a horizontal plane of the housing and the image generating means determines the initial position of the viewpoint and the point of gaze and if the angular speed of the right/left rotation detected by the angular speed sensor exceeds a predetermined first threshold value while the viewpoint stands still, the image generating means rotates the viewpoint to the right/left around the point of gaze at a predetermined angular speed, and if the angular speed of the left/right rotation detected by the angular speed sensor exceeds a predetermined second threshold value while the viewpoint is rotating to the right/left, the image generating means stops the rotation of the viewpoint and if the upward or downward acceleration detected by the acceleration sensor exceeds a predetermined third threshold value, the image generating means returns the viewpoint to the initial position.

In the preferred embodiment of the present invention, if the image generating means stops the rotation of the viewpoint since the angular speed exceeds the second threshold value, the image generating means does not determine if the angular speed exceeds the first threshold value or not for a certain period of time after that.

A storage medium provided by a fifth aspect of the present invention is a computer-readable storage medium storing a program which makes a computer function as controller control means for receiving an acceleration of movement or an angular speed of rotation of a housing from a controller operated by a user and image generating means which generates a game image obtained by photographing a predetermined direction from a predetermined viewpoint in a three-dimensional game space and moves the viewpoint if the received acceleration or angular speed exceeds a predetermined threshold value.

A storage medium provided by a sixth aspect of the present invention is a computer-readable storage medium storing a program which makes a computer function as controller control means for receiving an angular speed of rotation of a housing in a first specific direction from a controller operated by a user and image generating means for generating a game image obtained by photographing a three-dimensional game space from a predetermined viewpoint and starting movement of the viewpoint to the first specific direction if the received angular speed exceeds a predetermined threshold value.

Advantageous Effects of Invention

According to the present invention, since viewpoint of the game screen, that is, the camera position can be moved by an operation for rotation, movement and the like of the housing of the controller, that is, the controller itself, an operation of an operation member for operating a main character or the like is not prevented. Also, a user's operation can be facilitated not by using a value of the angular speed sensor or an acceleration sensor outputting an analog value (continuous value) as it is but by binarizing it in comparison with the threshold value and performing on/off control.

Figure 1:
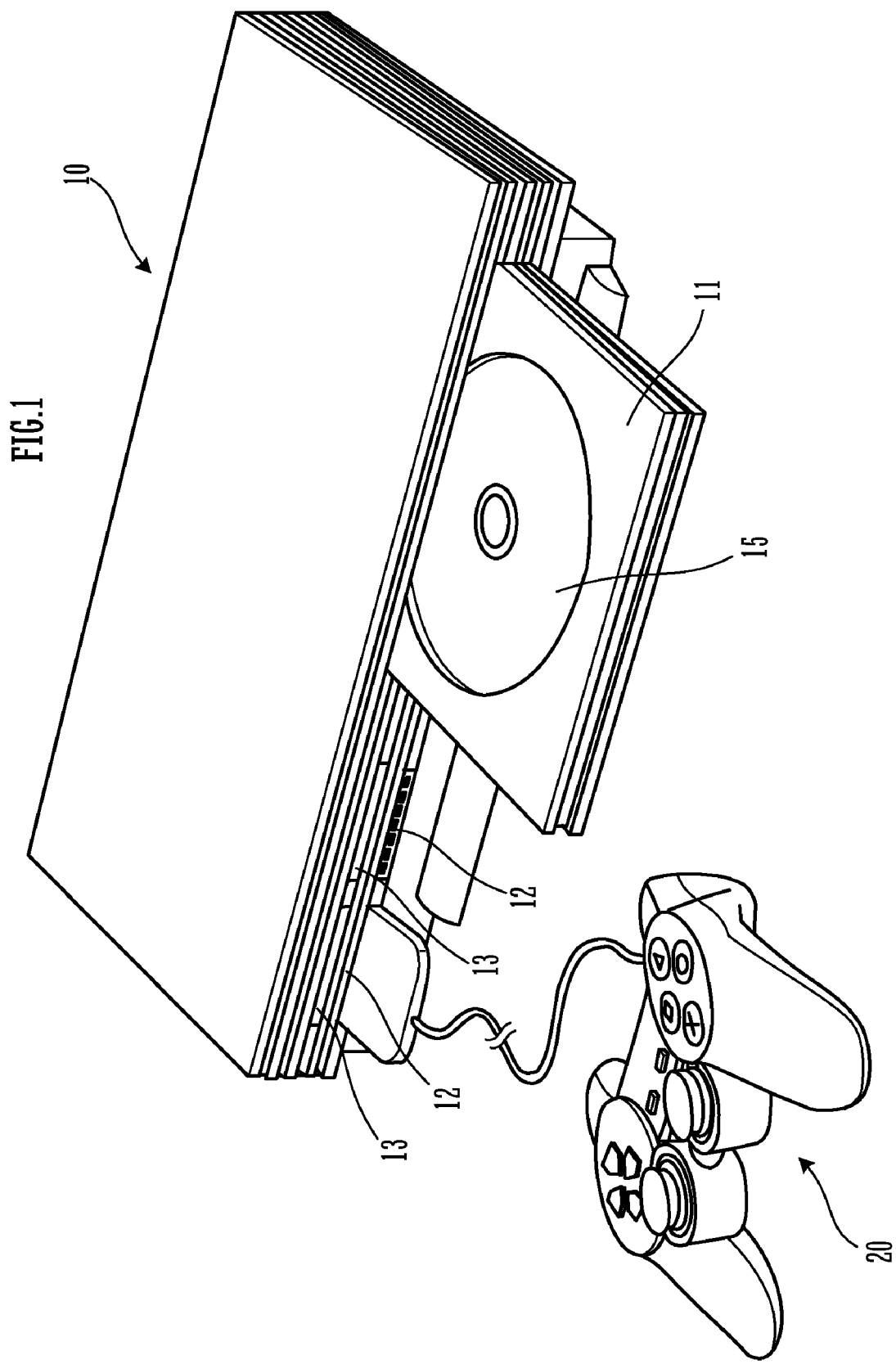
FIG. 1 is an appearance view of a game machine to which the present invention is applied.

REFERENCE SIGNS LIST 10 game machine main body
20 controller
23 triaxial acceleration sensor
24 gyro sensor
212 right analog stick
100 main character
101 point of gaze
110 camera (initial position)
Description of Embodiments A game system in which a program of the present invention is executed and control of a camera position ("viewpoint" of the present invention), which is projection position of a game image in a 3D game will be described referring to the attached drawings.

Here, the game system in which the program of the present invention is executed is a combination of a game machine main body (computer) 10 including peripheral equipment such as a controller 20 or the like, which will be described in FIGS. 1 to 3 and a plurality of function portions realized by the game program supplied by a storage medium 15. The function portions include a game image generation portion including a camera position control portion, an operation detection portion for detecting an operation of the controller 20 including an angular speed detection portion and an acceleration detection portion, which will be described later, and the like. A game function is realized by these plurality of function portions. The game image generation portion is mainly realized by a function of a CPU 31 executing the game program. The operation detection portion is realized by a CPU 31 and an operation member group 22, a triaxial acceleration sensor 23, a gyro sensor 24 and the like of the controller 20.

A configuration of the game machine will be described below.

FIG. 1 is a diagram illustrating an appearance of the game machine to which the present invention is applied.

This game machine is configured by connecting the controller 20 to the game machine main body 10. The controller 20 is operated by a user. The user can operate the main character or the like playing in the game using the controller 20 and control a viewpoint (hereinafter referred to as a camera position) of a game space displayed on a television device (See FIG. 3), which is a monitor 38. The television device is connected to the game machine main body 10 and functions as the monitor (display device) 38 and a speaker (audio device) 44.

The game machine main body 10 has a tray 11 on which a storage medium 15 storing the game program is set. The storage medium 15 is a DVD (digital versatile disc), for example. The game machine main body 10 reads the game program from the storage medium 15 and executes this program. The storage medium 15 may be other than DVD, and CD, Blu-ray Disc (registered trademark) or a built-in hard disk can be used, for example.

Also, on the front face of the device, memory slots 13 are disposed two each. In the memory slot 13, a connector 12 to which the controller 20 is connected and a card-type external memory 45 (See FIG. 3) made of a flash memory are set.

Figure 2:
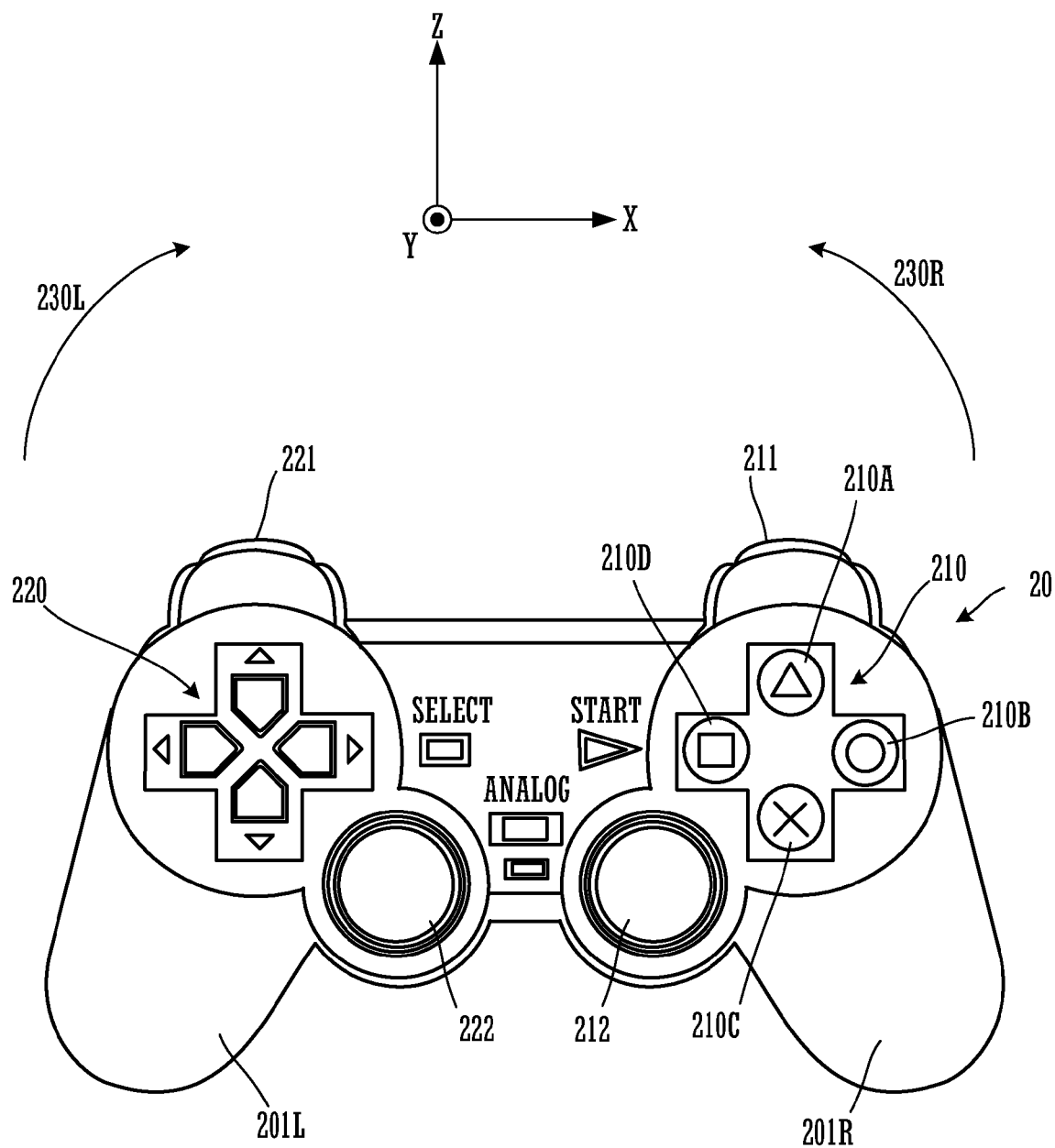
FIG. 2 is a plan view illustrating a structure of a controller of the game machine.

FIG. 2 is a plan view illustrating an appearance of the controller 20.

The controller 20 has a substantial U-shape and the user operates the controller 20 by grasping handles 201L and 201R on both wing parts with left and right hands, respectively. Operation members of operation button group 210, operation button group 220, analog stick 212 and analog stick 222 are disposed on the right and left upper faces of the controller 20, and an operation member of an R1 button 211 is disposed on the right front face of the controller 20 and an operation member of an L1 button 221 on the left front face. The operation button group 210 and the analog stick 212 are operated by the right thumb of the user, while the operation button group 220 and the analog stick 222 are operated by the left thumb of the user. The R1 button 211 and the L1 button 221 are operated by the right forefinger and the left forefinger of the user, respectively.

The right operation button group 210 includes four operation buttons 210A to 210D. The operation buttons 210A to 210D have identification marks of a triangle, a circle, a cross, and a square on the respective head parts to facilitate identification. The operation button group 210 is mainly set as buttons to make the main character playing in the game perform a specific operation. The specific operation is doing tricks, jumping and the like.

Also, the left operation button group 220 includes four operation buttons combined vertically and horizontally in a cross shape. The analog sticks 212 and 222 are operation members having sticks capable of inclining in 360 degrees including forward and backward as well as right and left.

In general, the analog stick 222 functions as an operation member for operating a moving direction and a moving speed of the main character, while the analog stick 212 functions as an operation member for controlling the camera position.

Also, in the controller 20, the triaxial acceleration sensor 23 (See FIG. 3) and the gyro sensor 24 (See FIG. 3) are incorporated. The triaxial acceleration sensor 23 detects acceleration in front and rear, right and left, and up and down applied to the housing of the controller 20. Here, the ±Z direction shown in FIG. 2 is referred to as the front-rear direction, the ±X direction as the right-left direction, and the ±Y direction as the up-down direction. The gyro sensor 24 detects an angular speed in a horizontal plane (XZ plane) applied to the housing of the controller. That is, the gyro sensor 24 detects a rotating operation of 230R and 230L of the controller 20 by the user.

As mentioned above, the controller 20 can detect an operation other than the operation of the various operation members by the user, that is, an operation for moving the controller 20 itself. The controller 20 in this embodiment includes the operation buttons and the analog sticks, but it may be a controller provided with either one of the operation buttons and the analog sticks.

Figure 3:
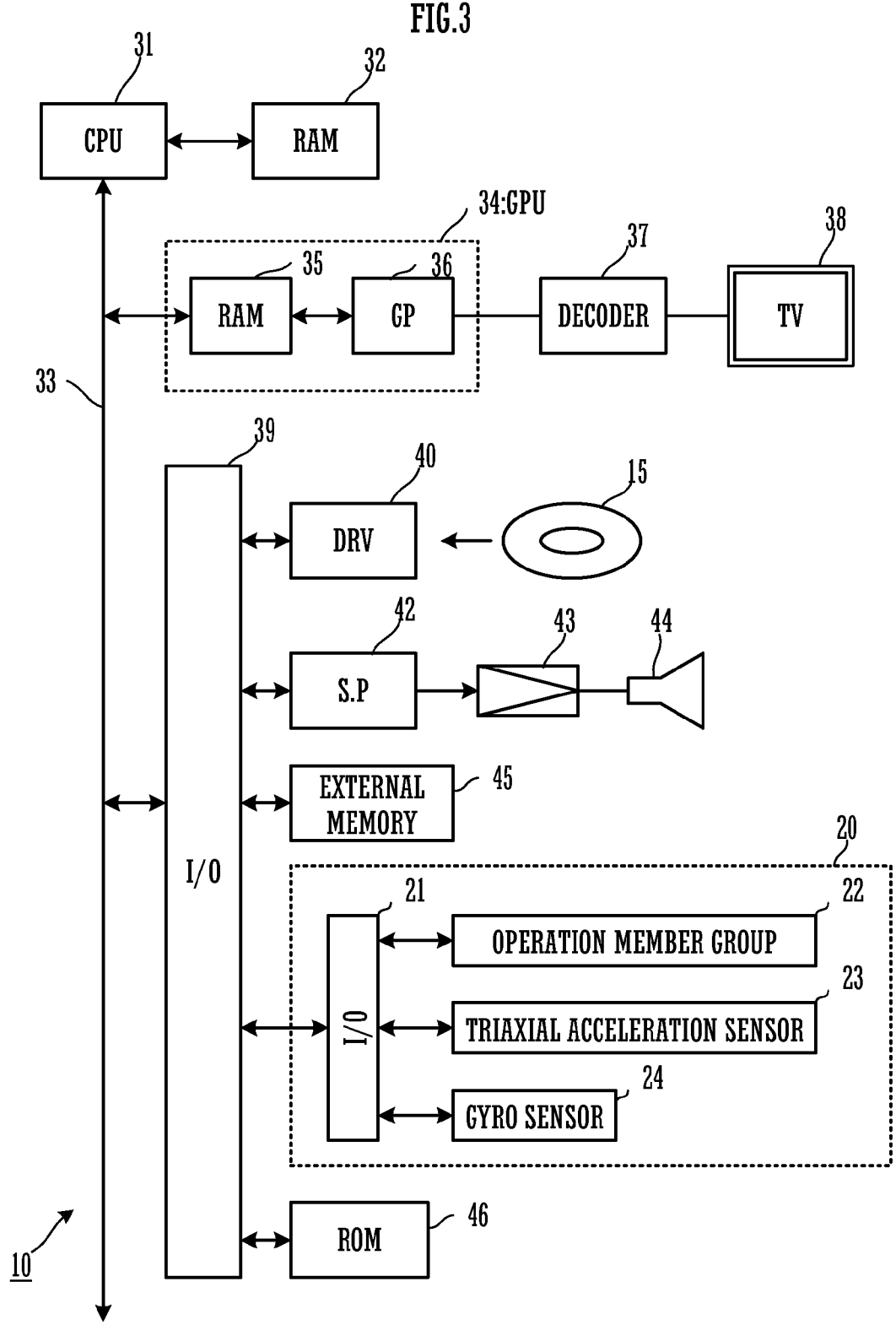
FIG. 3 is a block diagram illustrating an internal configuration of a game machine main body.

FIG. 3 is a block diagram illustrating an internal configuration of the game machine main body 10 and the controller 20.

The game machine main body 10 has the CPU 31 for controlling the operation of the entire device. To the CPU 31, a RAM 32 and a bus 33 are connected. In the RAM 32, various data is stored according to progress of the game.

To the bus 33, a graphic processor unit (GPU) 34 and an input/output (I/O) port 39 are connected. To the GPU 34, a monitor (television device: TV) 38, which is an external device, is connected through a decoder 37 for converting a digital video signal to the NTSC television method or the PAL television method.

To the I/O port 39, a driver (DRV) 40 for reproducing and decoding data stored in the storage medium 15 such as an optical disc, a sound processor (S. P) 42, the external memory 45, the controller 20, and a ROM 46 are connected.

The controller 20 includes the operation member group 22, the triaxial acceleration sensor 23, and the gyro sensor 24. The operation member group 22, the triaxial acceleration sensor 23, and the gyro sensor 24 are connected to an I/O port 21. Moreover, the I/O port 21 of the controller 20 is connected to the I/O port 39 of the game machine main body 10.

In the ROM 46, a system program for starting the game machine main body 10 and realizing basic functions is stored. In the external memory 45, user information and the progress or the like of the game which is being played are stored. The user can resume the game which was stopped in the middle from the timing of the stop by setting the storage medium 15 storing the game program and the external memory 45 of his/her own.

The sound processor 42 is connected to a speaker 44, which is an external device, through an amplifier 43. The speaker 44 is a speaker integral with the monitor 38 built in the television device in general.

The camera position control in the 3D game will be described below.

The camera position control executed by the camera position control portion of the game system in which the program of the present invention is executed will be described referring to FIG. 4.

In the game system executing the 3D game, a virtual camera is provided in a game space, which is a virtual three-dimensional space, and an image obtained by photographing the game space by this camera is outputted to the monitor 38 as a game image. The generation of the game image is executed by a game image generation portion including a rendering processing portion for rendering a landscape of the game space, a figure of the character and the like and the camera position control portion for controlling the camera position.

The camera position control portion sets a point of attention 101, which is a facing direction of a camera 110, in the game space. The point of attention 101 is a center point of an area where an activity of the main character is developing at that time in the game space and it is set slightly in front of the main character 100 in general. Also, the point of attention 101 is attached not only with a three-dimensional coordinate indicating the position but also information indicating an initial position of the camera 110 installed facing the point of attention 101. That is, the point of attention 101 has a nature like a start point of a vector. The camera 110 is installed at the initial position, which is a position in a predetermined direction, with a predetermined distance and at a predetermined elevation angle or depression angle from the point of attention 101 and facing the point of attention 101 based on the information of the point of attention 101.

Figure 4:
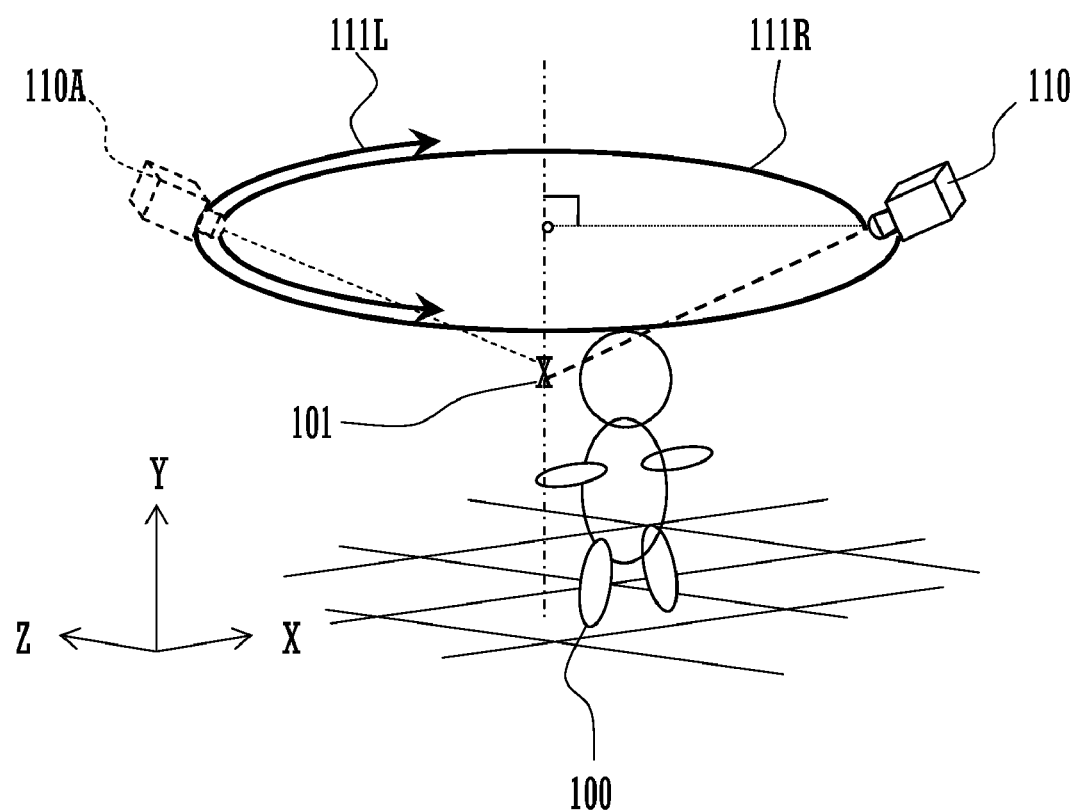
FIG. 4 is a diagram for explaining camera position control in a 3D game program, which is an embodiment of the present invention.

The initial position of the camera 110 is set at the camera position where a direction of the activity of the main character 100 is contained in the screen while the full-length figure of the main character 100 is being photographed from behind the main character 100, that is, the position of the camera 110 indicated by a solid line in FIG. 4.

Figure 5:
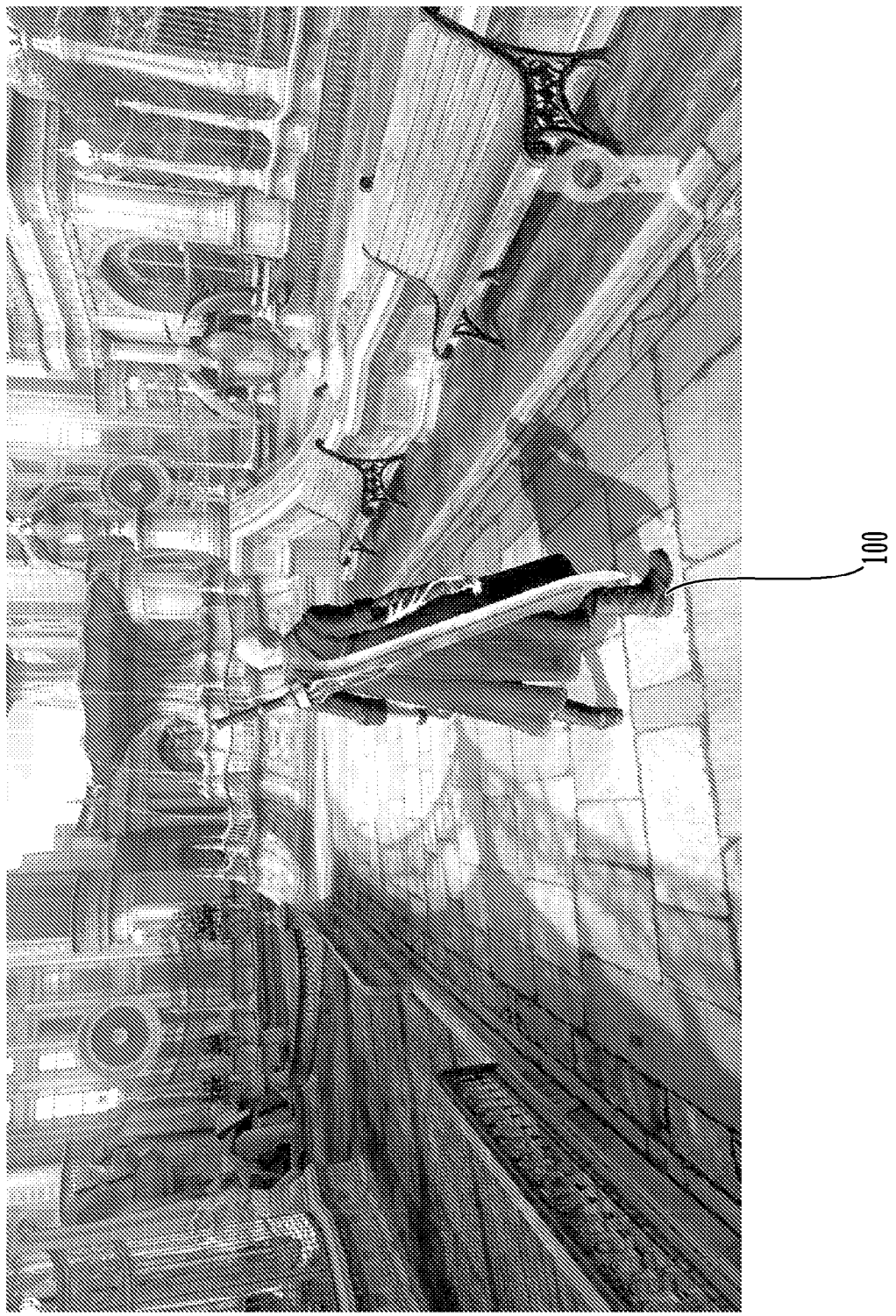
FIG. 5 is a diagram illustrating an example of a game image when the camera position is at an initial position.

A display example of the game image from the camera 110 at this initial position is shown in FIG. 5. This game image includes the full-length figure of the character 100 from behind and is an image obtained by photographing a landscape of the game space in front of the activity of the main character 100.

Also, in the game of this embodiment, the user can control the activity of the main character 100 in the game and can control the position of the camera 110 (camera position) by operating the controller 20. By means of this operation by the user, the camera position is rotated horizontally around the point of attention 101 (in the XZ plane in the game space) at a certain angular speed. That is, only the direction is changed at a certain speed while the distance and the elevation angle/depression angle from the point of attention 101 are maintained.

The camera position control portion of the game system processes the operation applied to the analog stick 212 and the housing itself of the controller 20 as a control operation of the camera position.

If the user tilts the analog stick 212 to the right or rotates the housing of the controller 20 to the right 230R (See FIG. 2), the camera position is rotated to the right. That is, the camera position is changed along the orbit of 111R. Also, if the user tilts the analog stick 212 to the left or rotates the housing of the controller 20 to the left 230L (See FIG. 2), the camera position is rotated to the left. That is, the camera position is changed along the orbit of 111L.

Figure 6:
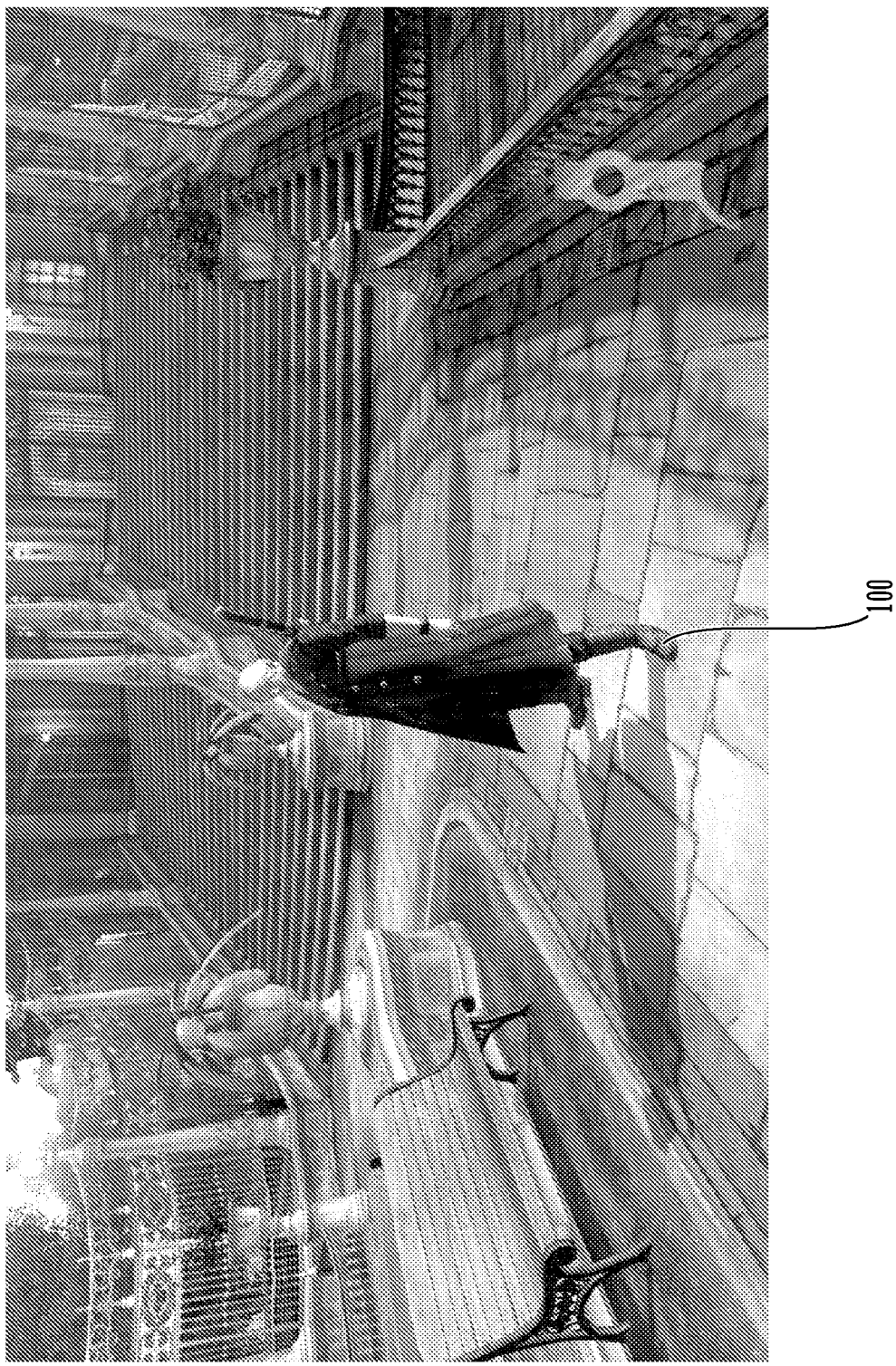
FIG. 6 is a diagram illustrating an example of the game image when the camera position is rotated and controlled so as to be moved.

FIG. 6 is a view illustrating an example of a game image when the camera position has been rotated to the position of 110A in FIG. 4. This game image displays the main character 100 substantially from the front and also displays the landscape behind the main character 100 since the camera position has been rotated to the side substantially opposite to the initial position 110.

As mentioned above, even in the same game space, the user can observe the game space from various angles by changing the camera position.

Here, the analog stick 212 is an operation member for outputting a value according to the tilted angle (analog value), but in this game system in which the program of the present invention is executed, in order to facilitate the operation, if a value outputted from the analog stick 212 exceeds a certain value, the operation is turned on and the camera position is rotated at a certain speed (angular speed). That is, if an output value of right tilting of the analog stick 212 exceeds a certain value, the camera position is rotated to the right at a certain speed, while if the output value of left tilting of the analog stick 212 exceeds a certain value, the camera position is rotated to the left at a certain speed.

The analog stick 212 also functions as a button switch by being pressed down from above. In the game system, the pressing-on operation from above of the analog stick 212 is set as a reset operation of the camera position. If the analog stick 212 is turned on, wherever the camera position is, the camera position is returned (reset) to the initial position 110.

The camera position control portion updates the camera position 101 by the minute according to the game scene at that time. Also, in the actual game, the camera position control portion determines not only the initial position instructed by information of the point of attention 101 and the rotation position instructed by the user's operation but also the camera position by further considering a movement path or the like of the point of attention 101.

As mentioned above, the analog stick 212 is an operation member operated by the right thumb, but the user should operate the operation button group 210 with the right thumb in order to control various activities of the main character 100. If the right thumb is occupied by the control of the camera position not directly relating to the activity of the main character 100, the activity of the main character 100 might be undermined. For example, the main character might be subjected to an attack by the enemy character. Then, this game system is configured such that the camera position can be controlled by an operation to move the controller 20 itself such as rotation without occupying the right thumb.

Figure 7A:
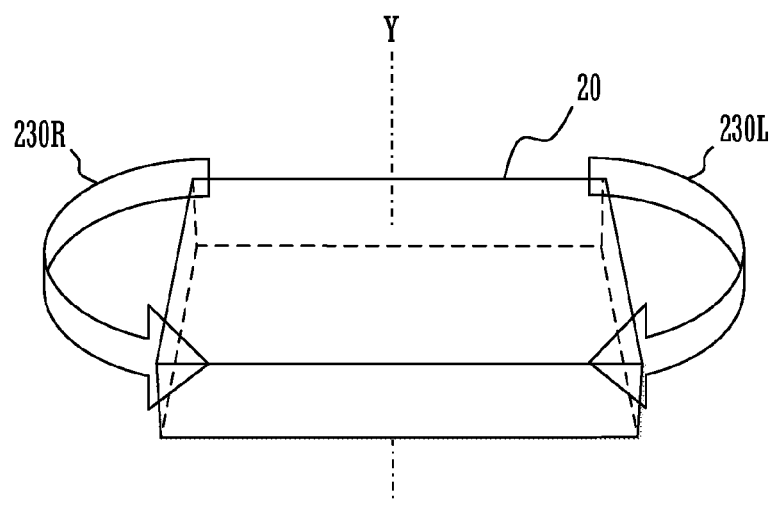
FIG. 7 is a diagram for explaining a mode when the camera position is controlled by swinging and operating a housing of the controller.

FIG. 7 are diagrams for explaining a mode of camera position control by an operation to move the housing of the controller 20. As shown in FIG. 7A, if the user rotates the controller 20 to the right 230R at an angular speed not less than a certain value (THA) (if a request to start rotation control of right rotation from an angular speed detection portion, which will be described later, is received), the camera position control portion rotates the camera position to the right 111R (See FIG. 4) at a certain speed. After that, if the user rotates the controller 20 to the left 230L at an angular speed not less than a certain value (THB) (if a request to stop camera is received from the angular speed detection portion, which will be described later), the camera position control portion stops the camera position rotation to the right 111R (See FIG. 4). In this embodiment, it is set such that THA>THB.

On the contrary, if the user rotates the controller 20 to the left 230L at an angular speed not less than a certain value (THA) (if a request to start rotation control to the left from the angular speed detection portion is received), the camera position control portion rotates the camera position to the left 111L (See FIG. 4) at a certain speed. After that, if the user rotates the controller 20 to the right 230R at an angular speed not less than a certain value (THB) (if a request to stop camera is received from the angular speed detection portion), the camera position control portion stops the camera position rotation to the left 111L (See FIG. 4).

Figure 7B:
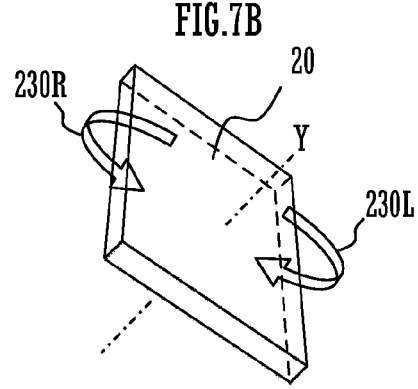

Since the gyro sensor 24 for detecting a rotating operation of the above 230L and 230R of the controller 20 is horizontally built in the housing, the rotating operation is performed not horizontally to the gravity force direction but horizontally to the housing of the controller 20, that is, based on the XZ plane shown in FIG. 2. Thus, even if the user holds the controller 20 in an inclined state as shown in FIG. 7B while lying down (lying), the camera position can be controlled by horizontally rotating it with respect to the housing of the controller 20.

Figure 7C:
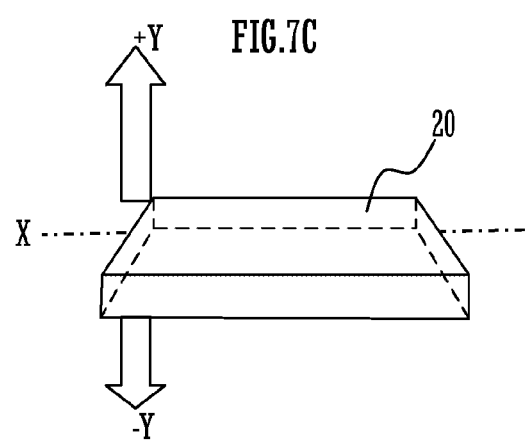

Moreover, the camera position control portion resets the camera position according to the vertical acceleration applied to the controller 20 as shown in FIG. 7C. If the user moves the controller 20 upward or downward at acceleration not less than a certain value (THV) (if a request to stop the camera is received from the acceleration detection portion), the camera position control portion resets the camera position to the initial position 110 (See FIG. 4). The direction to move may be either of an upward direction (+Y direction) or a downward (−Y direction).

In the above reset control of the camera position, in order to prevent misdetection by instantaneous hand shake when the user presses the operation button 210, 220 or the like, in this embodiment, a value obtained by integrating an acceleration value of several sample timings (frames) is used as an acceleration value of a determination target.

Since the triaxial acceleration sensor 23 for detecting the vertical acceleration of the controller 20 is built in along the XYZ axes of the housing, the moving operation in the vertical direction is performed not vertically with respect to the gravity force direction but vertically with respect to the housing of the controller 20, that is, based on the Y axis shown in FIG. 2. Thus, even if the user holds the controller 20 in the inclined state as shown in FIG. 7B while lying down (lying), the camera position can be reset by vertically moving it with respect to the housing of the controller 20.

FIG. 8 are flowcharts for explaining an operation of housing operation detection processing of the controller 20 by the operation detection portion of the game system.

Figures 8A, 8B:
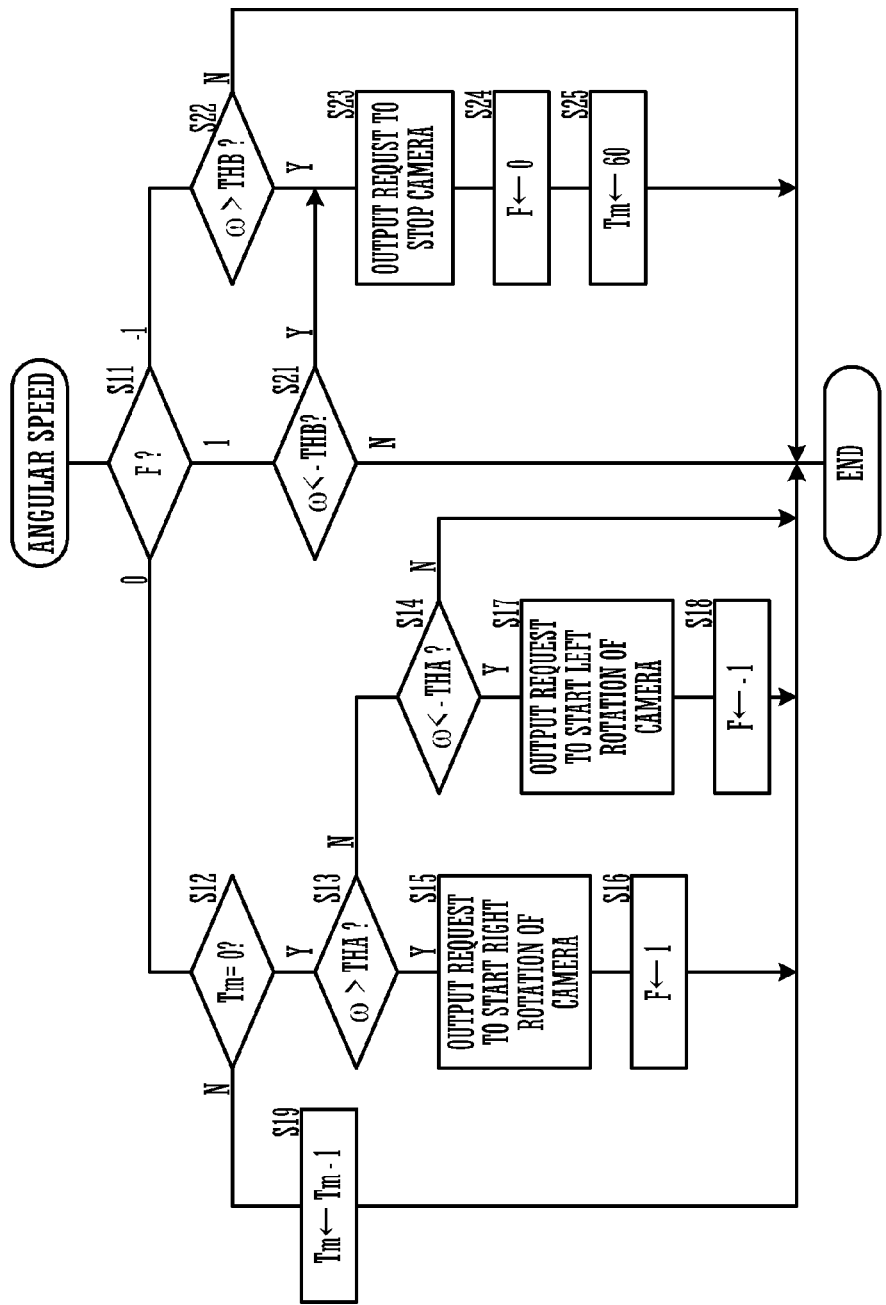
FIG. 8 is a flowchart illustrating a swinging operation detection operation in a game program.

FIG. 8A is a flowchart showing angular speed detection processing for controlling the rotation of the camera position by detecting a rotating operation of the controller 20. This angular speed detection processing is executed by the angular speed detection portion. The angular speed detection portion periodically (per 1/60 seconds, for example) receives an output value (angular speed) of the gyro sensor 24 from the controller 20. The processing in FIG. 8A is executed every time the output value of the gyro sensor 24 is received.

First, the angular speed detection portion determines contents of a flag F indicating a control state of the current camera position (S11). Here, if it is F=1, it indicates that the current camera position is during rotation control to the right, and if it is F=−1, it indicates that the camera position is currently during rotation control to the left. Also, if it is F=0, it indicates that the camera position is currently not during rotation control but in a static state.

If it is F=0, that is, if the camera position is in the static state at S11, the angular speed detection portion determines if a value of a mask timer Tm is 0 or not (S12). A function of the mask timer Tm will be described later. If the mask timer Tm is 0 (YES at S12), the angular speed detection portion determines if an absolute value of an angular speed ω received from the controller 20 exceeds a predetermined threshold value THA or not (S13, S14). That is, the gyro sensor 24 outputs a positive value when the controller 20 is rotated to the right and outputs a negative value when rotated to the left, and the angular speed detection portion determines if the angular speed ω exceeds the threshold value THA (S13) or not, or the angular speed ω is less than the threshold value −THA (S14) or not.

If the angular speed ω exceeds the threshold value THA (YES at S13), that is, if the controller 20 has been rotated to the right, the angular speed detection portion outputs a request to start the rotation control to rotate the camera position to the right corresponding to the current rotating operation to the right of the controller 20 to the camera position control portion (S15). Then, the angular speed detecting portion sets 1 indicating that the camera position is during right rotation control to the flag F (S16) and ends the current operation.

If the angular speed ω is less than the threshold value −THA (YES at S14), that is, if the controller 20 has been rotated to the left, the angular speed detection portion outputs a request to the camera position control portion to start the rotation control to the left of the camera position corresponding to the current rotating operation of the controller 20 to the left (S17). Then, the angular speed detection portion sets −1 indicating that the camera position is during the left rotation control to the flag F (S18) and ends the current operation.

If the value of the mask timer Tm is not 0 (1 or more) (NO at S12), the angular speed detection portion subtracts 1 from the value of the mask timer Tm (S19) and ends the current operation. If it is Tm=0 (YES at S12) but the absolute value of the angular speed ω does not exceed the threshold value THA (NO at S13 and S14), the angular speed detection portion does not do anything and ends the current operation.

If in the determination at S11, the flag F is 1 indicating that the camera position is currently during right rotation control, the angular speed detection portion determines if the angular speed ω is less than the threshold value −THB (S21). If the angular speed ω is less than the threshold value −THB (YES at S21), the angular speed detection portion outputs a request to stop camera to the camera position control portion in order to stop the right rotation control of the camera position corresponding to the current operation in the opposite direction (S23). Then, the angular speed detection portion sets 0 to the flag F (S24), sets 60 to the mask timer Tm which masks the angular speed determination processing (S25) and ends the current operation.

On the other hand, if the angular speed ω is not less than the threshold value −THB (NO at S21), the angular speed detection portion considers that the operation to stop the rotation control to rotate the camera to the right has not been performed and ends the current operation as it is.

Here, the function of the mask timer Tm will be described. If the rotation control is to be stopped while the camera position is subjected to the rotation control to the right/left direction, the user performs the rotation operation to the controller 20 to the left/right direction, but it is likely that the rotation operation to the left/right direction is not only processed by the current angular speed detection processing as an operation to stop the camera position but also processed by the subsequent angular speed detection processing as a rotation instruction operation of the camera position to the opposite direction. Thus, if the rotation control of the camera position is stopped according to the rotation operation of the controller 20 to the opposite direction, the opposite rotation of the camera position is prevented by operations to mask the determination on whether or not the angular speed ω exceeds the threshold value THA for a predetermined time and to stop the camera position. This mask time is arbitrary but approximately 1 second is appropriate, and in the angular speed detection processing performed with an interval of 1/60 seconds, 60 is set to the mask timer Tm.

If the flag F is −1 indicating that the camera position is currently during the left rotation control in the determination at S11, the angular speed detection portion determines if the angular speed ω exceeds the threshold value THB (S22). If the angular speed ω exceeds the threshold value THB (YES at S22), the angular speed detection portion outputs a request to stop camera to the camera position control portion in order to stop the left rotation control of the camera position corresponding to the current operation in the opposite direction (S23). Then, the angular speed detection portion sets 0 to the flag F (S24), sets 60 to the mask timer Tm which masks the angular speed determination processing (S25) and ends the current operation.

On the other hand, if the angular speed ω is not more than the threshold value THB (NO at S22), the angular speed detection portion considers that the operation to stop the rotation control of the camera to the left has not been performed and ends the current operation as it is.

FIG. 8B is a flowchart illustrating acceleration detection processing in the vertical direction instructing reset of the camera position by detecting an operation of vertical movement of the controller 20. The acceleration detection portion periodically (per 1/60 seconds of frame timing, for example) receives an output value (acceleration) of the triaxial acceleration sensor 23 from the controller 20. This processing is executed every time the output value of the triaxial acceleration sensor 23 is received.

If the current acceleration value is inputted, the acceleration detection portion calculates a total acceleration value α of 10 frames by totaling data of the past 9 frames and the current data (S31). Then, the acceleration detection portion determines if the absolute value of the total acceleration value α exceeds the threshold value THV or not (S32). That is, even if the user moves the controller 20 downward or upward, the camera position is reset, and determination is made by an absolute value regardless of the sign of the acceleration value α. If the absolute value of the acceleration value α exceeds the threshold value THV, the acceleration detection portion resets the camera position to the initial position 110 (See FIG. 4), and if the current camera position is during the rotation control, the rotation is stopped (S33). Then, the acceleration detection portion sets 0 to the flag F (S34) and ends the operation.

If the acceleration value α does not exceed the threshold value THV, the acceleration detection portion ends the operation as it is.

In the flowchart in FIG. 8A, the threshold value THA of the operation to start the rotation control of the camera position is made different from the threshold value THB of the operation to stop the rotation control (THA>THB), but THA and THB may be the same value or they may be set so as to have a relationship of THA<THB.

Also, in the flowchart in FIG. 8B, the threshold value of the upward operation and the threshold value of the downward operation are made common, but the threshold value of the upward operation and the threshold value of the downward operation may be set at different values.

Also, in this embodiment, the rotation control of the camera position is turned on/off on the basis of the angular speed of the horizontal plane of the controller 20, and the camera position is reset on the basis of the acceleration in the vertical direction, but the on/off of the rotation control of the camera position and reset of the camera position may be performed on the basis of another motion operation applied to the controller 20.

It may be so configured that, for example, if acceleration more than a certain level is applied in the right direction to the controller 20, the camera position is subjected to the rotation control to the right, while if the acceleration more than a certain level to the left direction is applied to the controller 20, the camera position is subjected to the rotation control to the left or the like. Also, control may be made using acceleration in other directions or the control may be made using speeds in three-dimensional directions. Moreover, the control may be made using angular acceleration of the rotating operation.

In the above embodiment, a 3D action game in which a main character is displayed in a game image has been described, but the present invention can be applied to a game with a first-person viewpoint which displays a game image from the viewpoint of the main character (player). In this case, it is only necessary that major operations such as movement of the main character or the like are controlled by each button of the controller 20 and the view (operation to orient the face) of the main character is controlled by either one of or both of the moving operation and the rotating operation of the controller 20 main body. Similarly, the present invention may be applied to a race game or a flight game so that the user's view is controlled.

Industrial Applicability

The present invention can be used in industrial fields in which arcade games and consumer games are manufactured and sold.

The invention claimed is:

1. A computer comprising:
an i/o interface operable to receive input from a controller; and
a processor cooperatively operable with the i/o interface, and configured to facilitate
receiving acceleration of movement of a controller housing or an angular speed of rotation of the controller housing from the controller operated by a user; and
generating a game image obtained by photographing a predetermined direction from a predetermined viewpoint in a three-dimensional game space and moving the viewpoint when the received acceleration or angular speed exceeds a predetermined threshold value.

2. A computer comprising:
an i/o interface operable to receive input from a controller; and
a processor cooperatively operable with the i/o interface, and configured to facilitate
receiving an angular speed of rotation in a first specific direction of a controller housing from a controller operated by a user; and
generating a game image obtained by photographing a three-dimensional game space from a predetermined viewpoint and starting movement of the viewpoint to the first specific direction when the received angular speed exceeds a predetermined threshold value.

3. The computer according to claim 2, wherein
the processor receives an angular speed of rotation in a second specific direction opposite to the first specific direction from the controller; and
the processor stops movement of the viewpoint to the first specific direction when an angular speed in the second specific direction exceeds a predetermined threshold value while the viewpoint is moving to the first specific direction.

4. The computer according to claim 2, wherein
the processor receives acceleration of movement of the controller housing in a predetermined direction; and
the processor returns the position of the viewpoint to a predetermined initial position when the received acceleration of movement exceeds a predetermined threshold value.

5. The computer according to claim 1, wherein
the processor receives acceleration of movement in the vertical direction and angular speeds of right rotation and left rotation in a horizontal plane of the controller housing;
the processor determines an initial position of the viewpoint and the point of gaze;
while the viewpoint stands still, if the angular speed of the right/left rotation detected by the angular speed sensor exceeds a predetermined first threshold value, the processor rotates the viewpoint to the right/left around the point of gaze at a predetermined angular speed;
while the viewpoint is rotated to the right/left, if the angular speed of the left/right rotation detected by the angular speed sensor exceeds a predetermined second threshold value, the processor stops rotation of the viewpoint; and
if acceleration in an upward or a downward direction detected by the acceleration sensor exceeds a predetermined third threshold value, the processor returns the viewpoint to the initial position.

6. The computer according to claim 5, wherein
the processor does not make determination on whether an angular speed has exceeded the first threshold value or not, for a certain period of time after the processor stops rotation of the viewpoint since the angular speed has exceeded the second threshold value.

7. The computer of claim 1, wherein
the acceleration of movement of the controller housing of the angular speed of rotation of the controller housing is with respect to a horizontal plane of the controller housing instead of with respect to a gravity force direction,
the viewpoint remains unmoved until the received acceleration or angular speed exceeds the predetermined threshold value.

8. The computer of claim 1, wherein the acceleration of movement of the controller is in the vertical direction of the controller housing, and the angular speed of rotation comprises angular speeds of right rotation and left rotation in a horizontal plane of the controller housing.

9. A program which makes a computer function as controller control means for receiving acceleration of movement of a controller housing or an angular speed of rotation of the controller housing from a controller operated by a user; and
image generating means for generating a game image obtained by photographing a predetermined direction from a predetermined viewpoint in a three-dimensional game space and for moving the viewpoint if the received acceleration or angular speed exceeds a predetermined threshold value.

10. A program which makes a computer function as controller control means for receiving an angular speed of rotation in a first specific direction of a controller housing from a controller operated by a user; and
image generating means for generating a game image obtained by photographing a three-dimensional game space from a predetermined viewpoint and for starting movement to the first specific direction of the viewpoint when the received angular speed exceeds a predetermined threshold value.

11. The program according to claim 10, wherein
the controller control means receives an angular speed of rotation in a second specific direction opposite to the first specific direction from the controller; and
the image generating means stops movement of the viewpoint to the first specific direction when an angular speed in the second specific direction exceeds a predetermined threshold value while the viewpoint is moving to the first specific direction.

12. The program according to claim 10, wherein
the controller control means receives acceleration of movement of the controller housing in a predetermined direction; and
the image generating means returns the position of the viewpoint to a predetermined initial position when the received acceleration of movement exceeds a predetermined threshold value.

13. The program according to claim 9, wherein
the controller control means receives acceleration of movement in the vertical direction and angular speeds of right rotation and left rotation in a horizontal plane of the controller housing;
the image generating means determines an initial position of the viewpoint and the point of gaze;
while the viewpoint stands still, if the angular speed of the right/left rotation detected by the angular speed sensor exceeds a predetermined first threshold value, the image generating means rotates the viewpoint to the right/left around the point of gaze at a predetermined angular speed;
while the viewpoint is rotated to the right/left, if the angular speed of the left/right rotation detected by the angular speed sensor exceeds a predetermined second threshold value, the image generating means stops rotation of the viewpoint; and
if acceleration in an upward or a downward direction detected by the acceleration sensor exceeds a predetermined third threshold value, the image generating means returns the viewpoint to the initial position.

14. The program according to claim 13, wherein
the image generating means does not make determination on whether the angular speed has exceeded the first threshold value or not, for a certain period of time after the image generating means stops rotation of the viewpoint since the angular speed has exceeded the second threshold value.

15. A non-transitory computer-readable storage medium storing a program which makes a computer perform the function of:
    receiving acceleration of movement of a controller housing or an angular speed of rotation of the controller housing from a controller operated by a user; and
    generating a game image obtained by photographing a predetermined direction from a predetermined viewpoint in a three-dimensional game space and for moving the viewpoint when the received acceleration or angular speed exceeds a predetermined threshold value.

16. A non-transitory computer-readable storage medium storing a program which makes a computer perform the function of:
    receiving an angular speed of rotation in a first specific direction of a controller housing from a controller operated by a user; and
    generating a game image obtained by photographing a three-dimensional game space from a predetermined viewpoint and for starting movement to the first specific direction of the viewpoint when the received angular speed exceeds a predetermined threshold value.

17. A method of controlling a viewpoint, comprising:
    receiving, in a computer, acceleration of movement of a controller housing or an angular speed of rotation of the controller housing, from a controller operated by a user; and
    generating, by the computer, a game image obtained by photographing a predetermined direction from a predetermined viewpoint in a three-dimensional game space and moving the viewpoint when the received acceleration or angular speed exceeds a predetermined threshold value.

18. A method of controlling a viewpoint, comprising:
    receiving, in a computer, an angular speed of rotation in a first specific direction of a controller housing, from a controller operated by a user; and
    generating, by the computer, a game image obtained by photographing a three-dimensional game space from a predetermined viewpoint and starting movement of the viewpoint to the first specific direction when the received angular speed exceeds a predetermined threshold value.

19. The method according to claim 18, wherein
    the computer receives an angular speed of rotation in a second specific direction opposite to the first specific direction from the controller; and
    the computer stops movement of the viewpoint to the first specific direction when an angular speed in the second specific direction exceeds a predetermined threshold value while the viewpoint is moving to the first specific direction.

20. The method of claim 17, wherein
    the acceleration of movement of the controller housing of the angular speed of rotation of the controller housing is with respect to a horizontal plane of the controller housing instead of with respect to a gravity force direction,
    the viewpoint remains unmoved until the received acceleration or angular speed exceeds the predetermined threshold value.

* * * * *